United States Patent [19]

Becker et al.

[11] Patent Number: 6,066,710
[45] Date of Patent: May 23, 2000

[54] IMIDE-CONTAINING POLYMERS MADE BY BULK POLYMERIZATION

[75] Inventors: Kevin H. Becker; Jerold C. Rosenfeld, both of Amherst, N.Y.

[73] Assignee: Occidental Chemical Corporation, Dallas, Tex.

[21] Appl. No.: 09/182,129

[22] Filed: Oct. 29, 1998

[51] Int. Cl.⁷ .................................................. C08G 73/10
[52] U.S. Cl. .............................. 528/170; 528/10; 528/26; 528/125; 528/128; 528/172; 528/173; 528/179; 528/185; 528/188; 528/220; 528/229; 528/310; 528/322; 528/350; 528/353
[58] Field of Search ................................. 528/353, 220, 528/229, 26, 10, 185, 188, 172, 173, 179, 125, 128, 350, 170, 310, 322

[56] References Cited

U.S. PATENT DOCUMENTS

| | | | |
|---|---|---|---|
| 4,983,690 | 1/1991 | Cameron et al. | 525/436 |
| 4,996,101 | 2/1991 | Landis et al. | 428/272 |
| 5,025,089 | 6/1991 | Vora et al. | 528/353 |
| 5,026,822 | 6/1991 | Vora | 528/353 |

OTHER PUBLICATIONS

An article by Imai et al., titled "Successful Synthesis of a 1:1 Salt Monomer Derived from Bis (4–aminophenyl) Ether and Pyromellitic Acid for Direct Polymerization to an Aromatic Polyimide" in J. Polym—Sci Part A: Polym. Chem. vol. 36 (1998).

Primary Examiner—P. Hampton-Hightower
Attorney, Agent, or Firm—Anne E. Brookes; Richard D. Fuerle

[57] ABSTRACT

Disclosed is a method of making an imide-containing polymer by bulk or melt polymerizing monomers. A mixture is formed of (1) a cyclic compound that contains an anhydride group and a second group which is an anhydride, a carboxylic acid, or an ester and (2) a diamine in an amount stoichiometric ±5 mole % of stoichiometric with the amount of cyclic compound. An end capper may also be included in the mixture to control the molecular weight but no solvent is used. A polyimidesiloxane can be made by using a siloxane-containing diamine. The mixture is heated to a temperature above the $T_g$ or $T_m$ of the polymer but below its degradation temperature.

20 Claims, No Drawings

IMIDE-CONTAINING POLYMERS MADE BY BULK POLYMERIZATION

BACKGROUND OF THE INVENTION

This invention relates to one-step bulk or melt polymerizing monomers to make imide-containing polymers. In particular, it relates to making polyimides and polyimidesiloxanes by the direct polycondensation of molten monomers in the absence of a solvent.

Many types of polymers are made by polycondensation of molten monomers, including polyesters and polyamides. The absence of a solvent in bulk polymerizations reduces the cost of the polymerization because the steps of removing the solvent from the polymer and recovering it are eliminated. While aliphatic-aromatic and aromatic polyimides have been made in the melt from the salt in a two-step synthesis, the direct polycondensation of dianhydride and diamine would be the most economical route available.

Polyimides and polyimidesiloxanes are widely used in the electronics industry and in other industries as adhesives, coatings, and sealants, as well as for structural films and fibers. These polymers have good thermal stability, which makes them useful for high temperature applications where other polymers can not be used. However, because of their high glass transition temperatures or melting points, it was believed that polyimides and polyimidesiloxanes would degrade if made by bulk polymerization.

SUMMARY OF THE INVENTION

I have discovered that imide-containing polymers, such as polyimides and polyimidesiloxanes, can be made by polymerizing molten monomers without a solvent being present. I have found that if the temperature is raised slowly, the polymerizations can occur in most cases before the polymer degrades. Depending upon the particular monomers used, some of the polymers made according to this invention can be remelted. Other advantages of the process of this invention include extremely short reaction times, low processing costs, and the elimination of solvents. This synthesis also lends itself to low cost downstream processing techniques, such as extrusion and injection molding.

DESCRIPTION OF THE PREFERRED EMBODIMENTS

The imide-containing polymers of this invention are polymerized from diamines and cyclic anhydrides. The proportion of diamine to anhydride is generally about stoichiometric but an excess (up to 5 mole %) of either the anhydride or the diamine can be used if desired to control molecular weight and lower melt viscosities.

The cyclic anhydride is a compound that contains a ring and two functional groups—an anhydride group and second group that may be an anhydride, a carboxylic acid, or an ester. If the second group is a carboxylic acid or an ester, the polymer will contain alternating imide and amide groups and will be a polyamideimide. The ring can be an aromatic ring or a non-aromatic carbocyclic ring formed of 6 carbon atoms. Aromatic ring compounds are preferred because they have better thermal stability. Examples of suitable dianhydrides include:

1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4,4'-biphenyl tetracarboxylic dianhydride (BPDA);
bicyclo-[2,2,2]-octen-(7)-2,3,5,6-tetracarboxylic-2,3,5,6-dianhydride;
thio-diphthalic anhydride;
bis (3,4-dicarboxyphenyl) sulfone dianhydride;
bis (3,4-dicarboxyphenyl) sulfoxide dianhydride;
bis (3,4-dicarboxyphenyl oxadiazole-1,3,4) paraphenylene dianhydride;
bis (3,4-dicarboxyphenyl) 2,5-oxadiazole 1,3,4-dianhydride;
bis 2,5-(3',4'-dicarboxydiphenylether) 1,3,4-oxadiazole dianhydride;
bis (3,4-dicarboxyphenyl) ether dianhydride or 4,4'-oxydiphthalic anhydride (ODPA);
bis (3,4-dicarboxyphenyl) thioether dianhydride;
bisphenol A dianhydride (BPADA);
bisphenol S dianhydride;
2,2-bis (3,4-dicarboxyphenyl) hexafluoropropane dianhydride or 5,5-[2,2,2-trifluoro-1-(trifluoromethyl) ethylidene] bis-1,3-isobenzofurandione) (6FDA);
hydroquinone bisether dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride;
resorcinol dianhydride; and
trimellitic anhydride (TMA).

Other anhydrides that can be used include bisphenol A dianhydride (BPADA), trimellitic acid ethylene glycol dianhydride (TMEG) and 5-(2,5-dioxotetrahydrol)-3-methyl-3-cyclohexene-1,2-dicarboxylic anhydride, sold by Chriskev as "B4400":

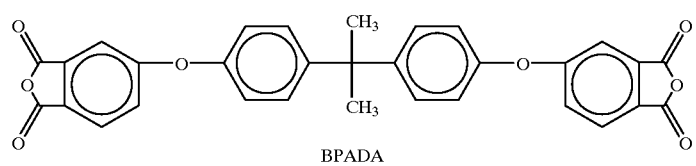

BPADA

The preferred anhydrides are TMA, BPADA, ODPA, 6FDA, and BPDA because they produce polymers that flow well and have a lower $T_g$. Mixtures of anhydrides are also contemplated.

Either aliphatic or aromatic diamines can be used in the process of this invention. Aromatic diamines are preferred as they have better thermal stability. Aromatic diamines can be mixed with aliphatic diamines to improve the flow properties of the polymer. Examples of suitable diamines include:
m-phenylenediamine;
p-phenylenediamine (PDA);
2,5-dimethyl-1,4-diaminobenzene or 2,5-dimethyl-1,4-phenylenediamine (DPX);
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline (ODA);
4,4'-diaminobenzophenone;
3,3',3,4', or 4,4'-diaminophenyl sulfone or m,m-, m,p- or p,p-sulfone dianiline;
4,4'-diaminodiphenyl sulfide;
3,3' or 4,4'-diaminodiphenylmethane or m,m- or p,p-methylene dianiline;
3,3'-dimethylbenzidine;
α,α'-bis(4-aminophenyl)-1,4-diisopropyl benzene or 4,4'-isopropylidenedianiline or bisaniline p;
α,α'-bis(4-aminophenyl)-1,3-diisopropyl benzene or 3,3'-isopropylidonedianiline or bisaniline m;
1,4-bis(p-aminophenoxy)benzene;
1,3-bis(p-aminophenoxy)benzene;
4,4'-bis(4-aminophenoxy)biphenyl;
1,3-bis(3-aminophenoxy)benzene (APB);
2,4-diamine-5-chlorotoluene;
2,4-diamine-6-chlorotoluene;
2,2-bis(4[4-aminophenoxy]phenyl)propane (BAPP);
trifluoromethyl-2,4-diaminobenzene;
trifluoromethyl-3,5-diaminobenzene;
2,2'-bis(4-aminophenyl)-hexafluoropropane (6F diamine);
2,2'-bis(4-phenoxy aniline) isopropylidene;
2,4,6-trimethyl-1,3-diaminobenzene;
4,4'-diamino-2,2'-trifluoromethyl diphenyloxide;
3,3'-diamino-5,5'-trifluoromethyl diphenyloxide;
4,4'-trifluoromethyl-2,2'-diaminobiphenyl;
2,4,6-trimethyl-1,3-diaminobenzene;
diaminoanthraquinone;
4,4'-oxybis[2-trifluoromethyl)benzeneamine] (1,2,4-OBABTF);
4,4'-oxybis[3-trifluoromethyl)benzeneamine];
4,4'-thiobis[(2-trifluoromethyl)benzeneamine];
4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine]; and
4,4'-[(2,2,2-trifluoromethyl-1-(trifluoromethyl)ethylidine) bis(3-trifluoromethyl)benzeneamine].

Other diamines that can be used include 1,12-diaminododecane (DDD), 1,6-hexane diamine (HDA), 1,4-butane diamine (BDA), 2-methyl-1,5-diaminopentane (sold by Dupont as "Ditech A"), and a 36 carbon aliphatic diamine (sold by Henkel as "Versamine"). The preferred diamines are APB, ODA, TDA, MPD, diaminododecane, and "Versamine" because polymers produced using those diamines flow well and have a lower $T_g$. Mixtures of diamines are also contemplated.

In order to make a polyimidesiloxane or a polyamideimidesiloxane, a siloxane-containing diamine is used for some or all of the diamine content of the polymer. Siloxane diamines have the general formula:

$$H_2N-R_1-\left[\begin{array}{c}R\\|\\Si-O\\|\\R\end{array}\right]_m\begin{array}{c}R\\|\\Si-R_1-NH_2\\|\\R\end{array}$$

where R is alkyl from $C_1$ to $C_4$, $R_1$ is alkylene from $C_1$ to $C_4$, and m is 1 to 200. In the formula, m is preferably 1 to 12 as those diamines produce polymers that are easier to process. (Siloxane diamines are herein referred to by the notation $G_m$.) The preferred siloxane diamines are $G_1$, as it lowers the $T_g$ of the polymer and makes the polymer easier to process, and $G_9$, as it makes the polymer rubbery and lowers its moisture absorption. The siloxane-containing diamine can be 0 to 100 mole % of the diamine content of the polymer. It is preferable that the siloxane diamine be 0 to about 30 mole % of the diamine content. If the anhydrides and non-siloxane-containing diamines are aromatic, it is preferable that the polymer be made from about 5 to about 30 mole % siloxane-containing diamine in order to lower the $T_g$ of the polymer. However, if aliphatic monomers are used, then siloxane-containing diamines are preferably not included in the polymer.

It is preferable to end cap the polymer to control its molecular weight because lower molecular weight polymers are easier to process in the melt. A mono-anhydride or mono-amine can be used as an end capper. Examples of suitable end cappers include phthalic anhydride and aniline and its derivatives. The preferred end capper is phthalic anhydride as it is inexpensive, works well, and maintains the polymer's thermal stability. About 0 to about 5 mole %, based on anhydride content, of an end capper can be used. Preferably, about 1 to about 3 mole %, based on anhydride content, of an end capper is included. No other components are needed to form polymers according to the process of this invention.

The polymers are formed by simply mixing together in a vessel, such as an extruder or a reactor, substantial quantities of the anhydride, diamine, and end capper (if one is used) in the proper proportions and heating. The order of addition of the components to the mixture can be altered to help improve the flow of the polymer. The mixture must be heated above the $T_g$ of the polymer but below its degradation temperature. If the polymer is crystalline, as some polymers formed from aliphatic monomers are, then the mixture should be heated above the $T_m$ of the polymer. Heating is begun at room temperature and the temperature is gradually raised to the final temperature required to achieve full imidization. It is preferable to heat to a temperature about 100 to about 150° C. above the $T_g$ or $T_m$ of the polymer if all aromatic monomers are used and about 50 to about 100° C. above the $T_g$ or $T_m$ of the polymer if some aliphatic monomers or siloxane diamines are used. While the particular temperature will depend upon the monomers that are present, generally polyimidesiloxanes and aliphatic polyimides are heated to about 250 to about 300° C. and aromatic polyimides and aromatic polyimidesiloxanes are heated to about 300 to about 400° C. The monomers are in a liquid state during heating and the polymer, at least until its molecular weight becomes too high, is also a liquid. The monomers are not significantly vaporized in the process of this invention, as they form low volatility oligomers at relatively low temperatures.

Polymerization is generally complete about 45 minutes to about 2 hours after beginning to heat at room temperature. The resulting polymers are thermoplastics and, depending on their components, some of them can be remelted. They can be used to make fibers, films, and various molded or extruded structures and as coatings, sealants, and adhesives. They are less expensive than similar polyimides and polyimidesiloxanes formed from solution and can be used to replace other injection moldable or extrudable thermoplastics. Other applications will no doubt occur to those skilled in the art.

The following examples further illustrate this invention.

EXAMPLE 1

1277.83 g (2.46 moles) BPADA, 14.84 g (0.100 moles) phthalic anhydride, 658.98 g (2.26 moles) APB, and 63.19 g (0.25 moles) $G_1$ were mixed together in a jar and ball milled for 30 minutes. The monomer mixture was fed into a twin screw extruder with 4 heating zones and a vacuum fitted vent to remove the water byproduct. The four heating zones were set at 125° C., 185° C., 240° C., and 215° C., with a total residence time of 8.5 minutes. The product was extruded out as a fiber. The total yield was 1797 g (94.1%) with most of the loss due to material remaining in the equipment. The yield should approach 100% for this reactive extrusion as batch size increases or in a continuous process.

EXAMPLE 2

A 1.5 L open stainless steel resin flask was equipped with a heating mantle, heavy gauge immersion thermocouple and a heavy duty mechanical stirrer with twin high viscosity blades, the upper one of which was inverted to force the material down into the vessel as it foamed due to water being released. With a slow stream of nitrogen blowing into the reactor, 115.86 g (0.40 moles) APB was charged. The heater was turned on, and, as the temperature of the contents rose to 100° C., 240.31 g (0.46 moles) BPADA and 1.38 g (0.009 moles) phthalic anhydride were charged into the mixture. Once the diamine melted, a viscous paste was formed and water began to emerge. After 15 minutes of stirring and heating this paste (temperature maintained below 120° C.), a mixture of 5.88 g (0.023 moles) $G_1$ and 37.95 g (0.047 moles) $G_9$ was slowly added over a 30 minute period with gentle heating up to about 150° C. Once all the monomers were in, the mixture was stirred for 10 minutes, and then rapidly heated. At about 165° C. (just above the Tg of the resultant polyimidesiloxane), water was rapidly formed and released, causing some foaming. At this point, the mixture was a partially imidized oligoimidesiloxane which had the appearance of a yellow pasty solid. Once the temperature reached about 210° C. (about 15 minutes more), the polymer became a viscous opaque melt. Heating was continued until about 240° C. and stirring continued for 5 more minutes. The heat was turned off and the polymer liquid was removed from the vessel while hot and placed in a steel pan to cool. Once cooled, the solid mass was ground into a yellow, opaque powder. The total yield was 334 g (87.2%), with the majority of lost material adhering to the inner surface of the reaction vessel.

EXAMPLE 3

Example 2 was repeated using 111.39 g (0.38 moles) APB, 256.56 g (0.49 moles) BPADA, 4.52 g (0.031 moles) phthalic anhydride, and 32.04 g (0.13 moles) $G_1$. Water formed at about 160° C., the polymer became a clear, brown, viscous melt at about 205° C., and heating was continued until about 260° C. Once cooled, the solid mass was ground into a yellow, translucent powder. The total yield was 345 g (90.3%).

EXAMPLES 4 TO 15

An anhydride, a non-siloxane diamine, and an optional siloxane diamine were combined in a vial and ball milled for 15 minutes. A portion of the mixture was placed on a glass slide on a hot plate and stirred as the hot plate was heated to 250° C. over 45 minutes to form a polymer melt. The melt was cooled to give a polyimide or a polyimidesiloxane. The following table gives the compositions and the results:

| | | Diamine | | |
|---|---|---|---|---|
| Example | Anhydride (g) | Non-Siloxane (g) | Siloxane (g) | Comments |
| 4 | BPADA 3.95 | TDA 0.80 | $G_1$ 0.25 | Highly viscous, clear brown polymer melt. Clear, brown solid polyimidesiloxane. |
| 5 | BPADA 3.61 | DDD 1.39 | — | Dark brown, low viscosity at 250° C., polymer liquid. Extremely sticky. |
| 6 | ODPA 3.04 | DDD 1.96 | — | Extremely rubbery polymer. Some smoke was emitted during reaction. |
| 7 | ODPA 3.64 | "Ditech A" 1.36 | — | Very little melt flow. Monomers polymerized readily at room temperature. |
| 8 | ODPA 1.79 | "Versamine" 3.21 | — | Extremely gummy polymer melt. Rubbery solid on cooling. |
| 9 | ODPA 2.76 | $G_1$ 2.24 | — | Low viscosity polymer melt. Extremely sticky polymer was formed. Some smoking. Monomers readily polymerized at room temperature. |
| 10 | BPDA 2.53 | APB 2.22 | $G_1$ 0.25 | High melt viscosity. Ideal for reactive extrusion. |
| 11 | TMA 2.00 | APB 2.75 | $G_1$ 0.25 | Extremely flowable liquid. Glassy solid on cooling. |
| 12 | 6FDA 3.04 | APB 1.71 | $G_1$ 0.25 | Low flow, high viscosity. |
| 13 | "B4400" 2.39 | APB 2.36 | $G_1$ 0.25 | Extremely viscous. |

-continued

| Example | Anhydride (g) | Diamine Non-Siloxane (g) | Siloxane (g) | Comments |
|---|---|---|---|---|
| 14 | TMA 2.45 | DDD 2.55 | — | Very low melt viscosity. Semi-crystalline polymer. |
| 15 | ODPA 2.57 | APB 2.43 | — | Highly viscous, rubbery melt. |

We claim:

1. A method of forming an imide-containing polymer comprising
   (A) mixing together in a vessel in the absence of a solvent
      (1) a cyclic compound containing an anhydride functionality and a second functionality selected from the group consisting of anhydride, carboxylic acid, and ester;
      (2) a diamine in an amount stoichiometric ±5 mole % of stoichiometric with the amount of said anhydride; and
      (3) up to about 5 mole %, based on anhydride content, of an end capper; and
   (B) heating said mixture to a temperature above the $T_g$ or $T_m$ of said polymer but below its degradation temperature.

2. A method according to claim 1 wherein said anhydride is trimellitic anhydride.

3. A method according to claim 1 wherein said anhydride is bisphenol A dianhydride.

4. A method according to claim 1 wherein said anhydride is 4,4'-oxydiphthalic anhydride.

5. A method according to claim 1 wherein said anhydride is 2,2-bis (3,4-dicarboxyphenyl) hexafluoropropane dianhydride.

6. A method according to claim 1 wherein said dianhydride is 3,3',4,4'-biphenyl tetracarboxylic dianhydride.

7. A method according to claim 1 wherein said diamine is 1,3-bis(3-aminophenoxy)benzene.

8. A method according to claim 1 wherein said diamine is 4,4'-oxydianiline.

9. A method according to claim 1 wherein said diamine is 2,4-diaminotoluene.

10. A method according to claim 1 wherein said diamine is m-phenylenediamine.

11. A method according to claim 1 wherein said diamine is a 36 carbon aliphatic diamine.

12. A method according to claim 1 wherein said diamine is 1,12-diaminododecane.

13. A method according to claim 1 wherein at least some of said diamine has the general formula

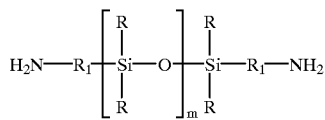

where R is alkyl from $C_1$ to $C_4$, $R_1$ is alkylene from $C_1$ to $C_4$, and m is 1 to 200.

14. A method according to claim 13 wherein m is 1 or 9.

15. A method according to claim 1 wherein said anhydride is aromatic and said diamine is a mixture of siloxane-containing diamine and non-siloxane-containing diamine.

16. A method of forming an imide-containing polymer comprising
   (A) mixing together in a vessel in the absence of a solvent
      (1) an aromatic compound containing an anhydride functionality and a second functionality selected from the group consisting of anhydride, carboxylic acid, and ester;
      (2) diamine in an amount stoichiometric ±5 mole % of stoichiometric with said aromatic compound, where said diamine is a mixture of
         (a) about 70 to about 95 mole % non-siloxane-containing diamine; and
         (b) about 5 to about 30 mole % siloxane-containing diamine; having the general formula

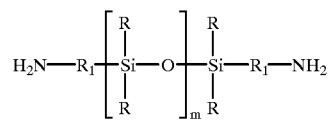

where R is alkyl from $C_1$ to $C_4$, $R_1$ is alkylene from $C_1$ to $C_4$, and m is 1 to 12; and
      (3) about 1 to about 3 mole %, based on content of said aromatic compound, of an end capper; and
   (B) heating said mixture to a temperature between about 250 and about 400° C., which is above the $T_g$ or $T_m$ of said polymer but below its degradation temperature.

17. A method according to claim 16 wherein said aromatic compound is selected from the group consisting of trimellitic anhydride, bisphenol A dianhydride, 4,4'-oxydiphthalic anhydride, 2,2-bis (3,4-dicarboxyphenyl) hexafluoropropane dianhydride, and 3,3',4,4'-biphenyl tetracarboxylic dianhydride.

18. A method according to claim 16 wherein said non-siloxane-containing diamine is selected from the group consisting of 1,3-bis(3-aminophenoxy)benzene, 4,4'-oxydianiline, 2,4-diaminotoluene, m-phenylenediamine, a 36 carbon aliphatic diamine, and 1,12-diaminododecane.

19. A method according to claim 16 wherein said end capper is phthalic anhydride.

20. A method of forming an imide-containing polymer comprising
   (A) mixing together in a vessel in the absence of a solvent
      (1) an anhydride is selected from the group consisting of trimellitic anhydride, bisphenol A dianhydride, 4,4'-oxydiphthalic anhydride, 2,2-bis (3,4-dicarboxyphenyl) hexafluoropropane dianhydride, and 3,3',4,4'-biphenyl tetracarboxylic dianhydride;
      (2) a diamine selected from the group consisting of 1,3-bis(3-aminophenoxy)benzene, 4,4'-oxydianiline, 2,4-diaminotoluene, m-phenylenediamine, a 36 carbon aliphatic diamine, and 1,12-diaminododecane in an amount stoichiometric ±5 mole % of stoichiometric with said anhydride, and
      (3) about 1 to about 3 mole %, based on anhydride content, of phthalic anhydride; and
   (B) heating said mixture to a temperature above the $T_g$ or $T_m$ of said polymer but below its degradation temperature.

* * * * *